(12) United States Patent
Teraoka

(10) Patent No.: US 11,262,551 B2
(45) Date of Patent: Mar. 1, 2022

(54) CAMERA LENS

(71) Applicant: AAC Optics Solutions Pte. Ltd., Singapore (SG)

(72) Inventor: Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 304 days.

(21) Appl. No.: 16/726,979

(22) Filed: Dec. 26, 2019

(65) Prior Publication Data
US 2021/0048632 A1 Feb. 18, 2021

(30) Foreign Application Priority Data
Aug. 14, 2019 (JP) .............................. JP2019-148900

(51) Int. Cl.
| G02B 9/62 | (2006.01) |
| G02B 13/00 | (2006.01) |
| G02B 5/20 | (2006.01) |
| G02B 13/18 | (2006.01) |
| G02B 27/00 | (2006.01) |
| G02B 5/00 | (2006.01) |

(52) U.S. Cl.
CPC .......... *G02B 13/0045* (2013.01); *G02B 5/208* (2013.01); *G02B 9/62* (2013.01); *G02B 13/18* (2013.01); *G02B 27/0025* (2013.01); *G02B 5/005* (2013.01)

(58) Field of Classification Search
CPC .......... G02B 9/62; G02B 13/18; G02B 5/005; G02B 13/0045; G02B 5/508; H04N 5/2396; H04N 5/2254
USPC .......... 359/713, 740, 756, 757, 758
See application file for complete search history.

(56) References Cited

U.S. PATENT DOCUMENTS

| 8,780,454 B2 * | 7/2014 | Lee ........................ G02B 13/04 359/691 |
| 2012/0243108 A1 * | 9/2012 | Tsai ........................ G02B 13/18 359/713 |
| 2013/0050846 A1 * | 2/2013 | Huang ............... G02B 13/0045 359/713 |
| 2016/0033744 A1 * | 2/2016 | Tsai ................... G02B 13/0045 359/713 |
| 2016/0041368 A1 * | 2/2016 | Chen .................. G02B 13/0045 359/713 |
| 2016/0085052 A1 * | 3/2016 | Park ................... G02B 13/0045 359/713 |
| 2016/0187620 A1 * | 6/2016 | Huang ............... G02B 13/0045 359/713 |
| 2016/0187621 A1 * | 6/2016 | Chen ........................ G02B 9/62 359/713 |
| 2018/0024323 A1 * | 1/2018 | Teraoka .................. G02B 9/62 359/713 |

(Continued)

*Primary Examiner* — Evelyn A Lester
(74) *Attorney, Agent, or Firm* — W&G Law Group

(57) ABSTRACT

The present disclosure provides a camera lens including six lenses, having good optical characteristics under near-infrared light and having a bright F number. The camera lens includes, from an object side: a first lens having a positive refractive power; a second lens having a negative refractive power; a third lens having a positive refractive power; a fourth lens having a positive refractive power; a fifth lens having a negative refractive power; and a sixth lens having a positive refractive power. The camera lens satisfies prescribed conditions.

6 Claims, 3 Drawing Sheets

(56) References Cited

U.S. PATENT DOCUMENTS

| | | | |
|---|---|---|---|
| 2018/0024324 A1* | 1/2018 | Teraoka | G02B 9/62 359/713 |
| 2018/0024325 A1* | 1/2018 | Teraoka | G02B 13/0045 359/713 |
| 2018/0024326 A1* | 1/2018 | Teraoka | G02B 13/0045 359/713 |
| 2021/0048632 A1* | 2/2021 | Teraoka | G02B 9/62 |

* cited by examiner

CAMERA LENS

TECHNICAL FIELD

The present disclosure relates to the field of camera lens, and more particularly, to a camera lens, which includes six lenses, has good optical characteristics under near-infrared light, has a bright F number (hereinafter, FNO), and is applicable to driver monitoring or the likes.

BACKGROUND

In recent years, a driver monitoring system has been developed for photographing a driver of a vehicle or the like, detecting the driver's sleepiness and side-looking based on an image and performing a warning. In such system, it is required that a camera lens for photographing the driver has good optical characteristics under near-infrared light and has a bright FNO.

In the related art, a camera lens has been proposed, which includes, from an object side: a first lens having a positive refractive power, a second lens having a negative refractive power, a third lens having a positive refractive power and a fourth lens having a positive refractive power, and the camera lens has good optical characteristics under near-infrared light. However, an FNO of the camera lens is only within a range of 1.8 to 2.6, which is not bright sufficiently.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
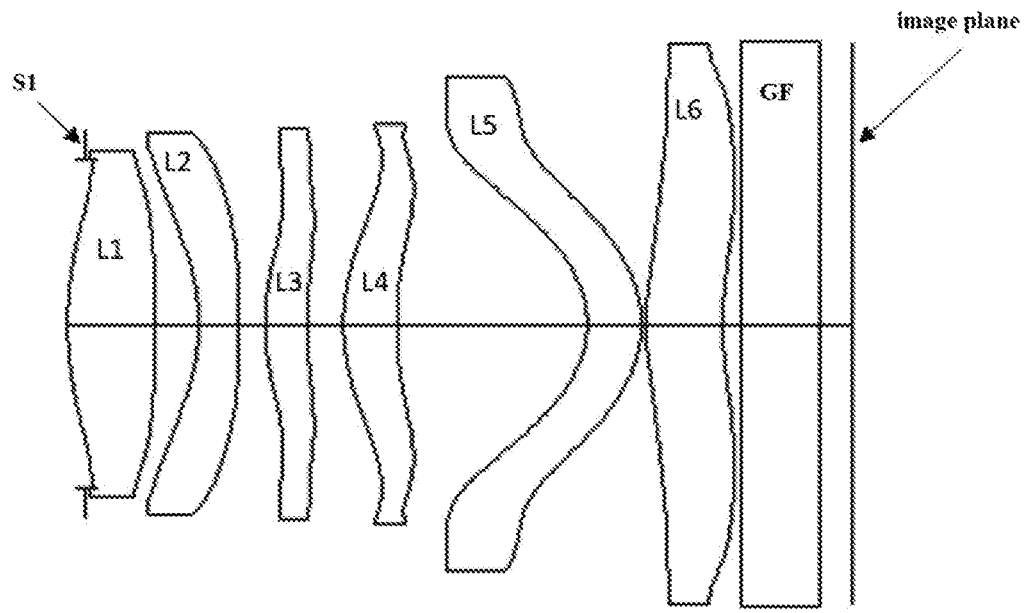
FIG. 1 is a schematic diagram of a structure of a camera lens LA in accordance with Embodiment 1 of the present disclosure.

A camera lens provided by exemplary embodiments of the present disclosure will hereinafter be described in detail. The camera lens LA includes, from an object side to an image side, a first lens L1, a second lens L2, a third lens L3, a fourth lens L4, a fifth lens L5 and a sixth lens L6 that constitute a lens system. A glass plate GF is arranged between the sixth lens L6 and an image plane. The glass plate GF may be a cover glass, various optical filters and the like. In the present disclosure, the glass plate GF may be arranged at different positions or may be omitted.

The first lens L1 has a positive refractive power, the second lens L2 has a negative refractive power, the third lens L3 has a positive refractive power, the fourth lens L4 has a positive refractive power, the fifth lens L5 has a negative refractive power, and the sixth lens L6 has a positive refractive power. Regarding surfaces of these six lenses, in order to correct various aberrations well, it is preferable to make each surface be an aspherical surface.

The camera lens LA satisfies conditions (1) and (2) as follows:

$$0.02 \leq |R3/R4| \leq 0.30 \quad (1); \text{ and}$$

$$0.60 \leq f3/f \leq 1.20 \quad (2),$$

where

R3 denotes a curvature radius of an object side surface of the second lens,

R4 denotes a curvature radius of an image side surface of the second lens, f denotes a focal length of the camera lens, and f3 denotes a focal length of the third lens.

The condition (1) defines a ratio of the curvature radius R3 of the object side surface of the second lens L2 to the curvature radius R4 of the image side surface of the second lens L2. Out of a range of the condition (1), it is difficult to achieve good optical characteristics under near-infrared light while making an FNO bright, and thus it is not preferable.

The condition (2) defines the positive refractive power of the third lens L3. Out of a range of the condition (2), it is difficult to achieve good optical characteristics under near-infrared light while making an FNO bright, and thus it is not preferable.

The camera lens LA satisfies a condition (3) as follows:

$$1.00 \leq f1/f \leq 2.20 \quad (3),$$

where f denotes the focal length of the camera lens; and f1 denotes a focal length of the first lens.

The condition (3) defines the positive refractive power of the third lens L3. Within a range of the condition (3), it is advantageous to achieve good optical characteristics under near-infrared light while making an FNO bright, and thus it is preferable.

The camera lens LA satisfies a condition (4) as follows:

$$-1.00 \leq f2/f \leq -0.50 \quad (4),$$

where f denotes the focal length of the camera lens; and f2 denotes a focal length of the second lens.

The condition (4) defines the negative refractive power of the second lens L2. Within a range of the condition (4), it is advantageous to achieve good optical characteristics under near-infrared light while making an FNO bright, and thus it is preferable.

The camera lens LA satisfies a condition (5) as follows:

$$-2.50 \leq f1/f2 \leq -1.50 \quad (5),$$

where f1 denotes the focal length of the first lens; and f2 denotes the focal length of the second lens.

The condition (5) defines a ratio of the focal length f1 of the first lens L1 to the focal length f2 of the second lens L2. Within a range of the condition (5), it is advantageous to achieve good optical characteristics under near-infrared light while making an FNO bright, and thus it is preferable.

The camera lens LA satisfies a condition (6) as follows:

$$0.15 \leq R5/R6 \leq 0.35 \quad (6),$$

where

R5 denotes a curvature radius of an object side surface of the third lens; and

R6 denotes a curvature radius of an image side surface of the third lens.

The condition (6) defines a ratio of the curvature radius R5 of the object side surface of the third lens L3 to the curvature radius R6 of the image side surface of the third lens L3. Within a range of the condition (6), it is advantageous to achieve good optical characteristics under near-infrared light while making an FNO bright, and thus it is preferable.

The camera lens LA satisfies a condition (7) as follows:

$$0.55 \leq R7/R8 \leq 0.85 \quad (7),$$

where

R7 denotes a curvature radius of an object side surface of the fourth lens, and

R8 denotes a curvature radius of an image side surface of the fourth lens.

The condition (7) defines a ratio of the curvature radius R7 of the object side surface of the fourth lens L4 to the curvature radius R8 of the image side surface of the fourth lens L4. Within a range of the condition (7), it is advantageous to achieve good optical characteristics under near-infrared light while making an FNO bright, and thus it is preferable.

Each of the six lenses constituting the camera lens LA satisfies the above-mentioned configuration and condition, thereby obtaining a camera lens having good optical characteristics under near-infrared light and having a bright FNO.

Hereinafter, the camera lens LA provided by the present disclosure will be described in exemplary embodiments. Reference numbers described in respective embodiments are as follows. In addition, a distance, a radius and a center thickness are all in units of mm.

f: focal length of the camera lens LA;
f1: focal length of the first lens L1;
f2: focal length of the second lens L2;
f3: focal length of the third lens L3;
f4: focal length of the fourth lens L4;
f5: focal length of the fifth lens L5;
f6: focal length of the sixth lens L6;
FNO: F number;
2ω: FOV (field of view);
S1: aperture;
R: curvature radius of an optical surface, a central curvature radius for a lens;
R1: curvature radius of an object side surface of the first lens L1;
R2: curvature radius of an image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of an object side surface of the fifth lens L5;
R10: curvature radius of an image side surface of the fifth lens L5;
R11: curvature radius of an object side surface of the sixth lens L6;
R12: curvature radius of an image side surface of the sixth lens L6;
R13: curvature radius of an object side surface of the glass plate GF;
R14: curvature radius of an image side surface of the glass plate GF;
d: center thickness of a lens and distance between lenses;
d0: on-axis distance from the aperture S1 to the object side surface of the first lens L1;
d1: center thickness of the first lens L1;
d2: on-axis distance from the image side surface of the first lens L1 to the object side surface of the second lens L2;
d3: center thickness of the second lens L2;
d4: on-axis distance from the image side surface of the second lens L2 to the object side surface of the third lens L3;
d5: center thickness of the third lens L3;
d6: on-axis distance from the image side surface of the third lens L3 to the object side surface of the fourth lens L4;
d7: center thickness of the fourth lens L4;
d8: on-axis distance from the image side surface of the fourth lens L4 to the object side surface of the fifth lens L5;
d9: center thickness of the fifth lens L5;
d10: on-axis distance from the image side surface of the fifth lens L5 to the object side surface of the sixth lens L6;
d11: center thickness of the sixth lens L6;
d12: on-axis distance from the image side surface of the sixth lens L6 to the object side surface of the glass plate GF;
d13: center thickness of the glass plate GF;
d14: on-axis distance from the image side surface of the glass plate GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the glass plate GF;
v: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the glass plate GF;
TTL: optical length (a total optical length from the object side surface of the first lens L1 to the image plane of the camera lens along an optic axis);
LB: on-axis distance from the image side surface of the sixth lens L6 to the image plane (including a thickness of the glass plate GF).

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (8)$$

For convenience, an aspheric surface of each lens surface uses the aspheric surfaces shown in the above formula (8). However, the present disclosure is not limited to the aspherical polynomials form shown in the formula (8).

Embodiment 1

FIG. 1 is a schematic diagram of a structure of a camera lens LA in accordance with Embodiment 1 of the present disclosure. In Embodiment 1, the camera lens LA includes a first lens L1 to a sixth lens L6. In the following, Table 1 shows respective curvature radiuses R of the object side and the image side of each of the first lens L1 to the sixth lens L6, the center thickness of each lens or the distance d between lenses, the refractive index nd and the abbe number ν, Table 2 shows conic coefficients k and aspherical coefficients, and Table 3 shows 2ω, FNO, f, f1, f2, f3, f4, f5, f6, TTL and IH.

TABLE 1

| | R | d | | nd | | νd | Effective radius (mm) |
|---|---|---|---|---|---|---|---|
| S1 | ∞ | d0= | −0.200 | | | | 1.835 |
| R1 | 3.84619 | d1= | 0.950 | nd1 | 1.5286 | ν1 76.98 | 1.876 |
| R2 | −18.37583 | d2= | 0.469 | | | | 1.930 |
| R3 | −2.26393 | d3= | 0.425 | nd2 | 1.6355 | ν2 23.97 | 2.012 |
| R4 | 90.55710 | d4= | 0.288 | | | | 2.140 |
| R5 | 2.41318 | d5= | 0.458 | nd3 | 1.6355 | ν3 23.97 | 2.190 |
| R6 | 6.99750 | d6= | 0.387 | | | | 2.160 |
| R7 | 2.27383 | d7= | 0.579 | nd4 | 1.6355 | ν4 23.97 | 2.197 |
| R8 | 3.99211 | d8= | 2.056 | | | | 2.230 |
| R9 | −1.08854 | d9= | 0.585 | nd5 | 1.6355 | ν5 23.97 | 2.504 |
| R10 | −1.34649 | d10= | 0.050 | | | | 2.757 |
| R11 | 3.24568 | d11= | 0.823 | nd6 | 1.6355 | ν6 23.97 | 3.088 |
| R12 | 3.34499 | d12= | 0.200 | | | | 3.134 |
| R13 | ∞ | d13= | 0.845 | nd7 | 1.5168 | ν7 64.17 | 3.145 |
| R14 | ∞ | d14= | 0.356 | | | | 3.161 |

Reference wavelength = 940 nm

Table 10 which will be described later shows values corresponding to the respective values of the first to third embodiments and the parameters defined by the conditions (1) to (7).

As shown in Table 10, Embodiment 1 satisfies the conditions (1) to (7).

Figure 2:
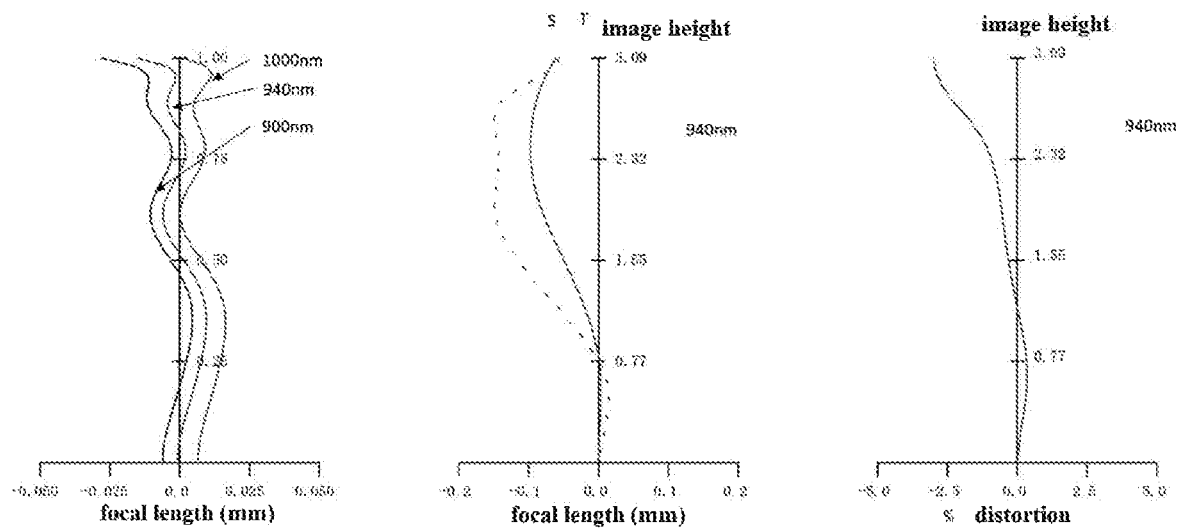
FIG. 2 is a schematic diagram of a spherical aberration, a field curvature and a distortion of the camera lens LA in accordance with Embodiment 1 of the present disclosure.

A spherical aberration, a field curvature and a distortion of the camera lens LA in Embodiment 1 are as shown in FIG. 2. Further, the field curvature S is a field curvature in a sagittal direction and T is a field curvature in a tangential direction, and same for Embodiments 2 and 3. Regarding the camera lens LA in Embodiment 1, as shown in Table 3, FNO=1.57 is bright, and as shown in FIG. 2, it has good optical characteristics under near-infrared light.

Embodiment 2

Figure 3:
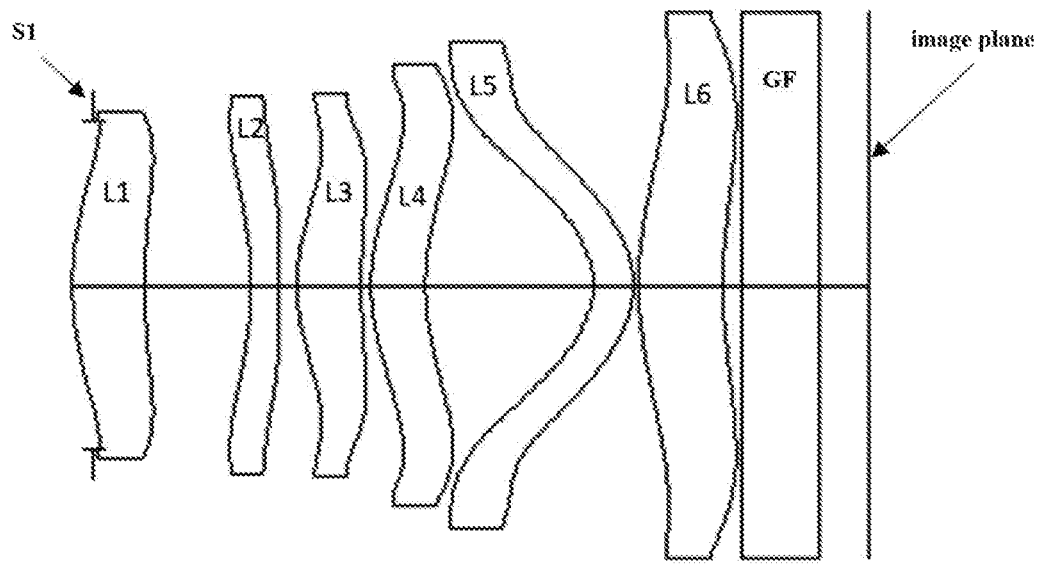
FIG. 3 is a schematic diagram of a structure of a camera lens LA in accordance with Embodiment 2 of the present disclosure.

FIG. 3 is a schematic diagram of a structure of a camera lens LA in accordance with Embodiment 2 of the present disclosure. In Embodiment 2, the camera lens LA includes a first lens L1 to a sixth lens L6. In the following, Table 4 shows respective curvature radiuses R of the object side and the image side of each of the first lens L1 to the sixth lens L6, the center thickness of each lens or the distance d between lenses, the refractive index nd and the abbe number ν, Table 5 shows conic coefficients k and aspherical coefficients, and Table 6 shows 2ω, FNO, f, f1, f2, f3, f4, f5, f6, TTL, and IH.

TABLE 2

| | Conic coefficient | Aspherical surface coefficients | | | | | | |
|---|---|---|---|---|---|---|---|---|
| | k | A4 | A6 | A8 | A10 | A12 | A14 | A16 |
| R1 | −5.6103E+00 | 3.9583E−03 | 4.3282E−05 | −2.2518E−03 | 3.1628E−04 | 0.0000E+00 | 0.0000E+00 | 0.0000E+00 |
| R2 | 0.0000E+00 | −3.5143E−03 | −6.7657E−03 | 1.3354E−03 | 0.0000E+00 | 0.0000E+00 | 0.0000E+00 | 0.0000E+00 |
| R3 | 0.0000E+00 | 3.0454E−02 | 4.4535E−03 | −1.3910E−03 | 2.9990E−04 | −1.7010E−05 | 0.0000E+00 | 0.0000E+00 |
| R4 | 0.0000E+00 | −8.9851E−02 | 4.8541E−02 | −0.4828E−02 | 2.2455E−03 | −1.4127E−04 | 0.0000E+00 | 0.0000E+00 |
| R5 | 0.0000E+00 | −3.6287E−02 | −6.0448E−02 | 4.9019E−02 | −2.2068E−02 | 5.9604E−03 | −8.5908E−04 | 4.9787E−05 |
| R6 | 0.0000E+00 | 6.1767E−02 | −1.3024E−01 | 8.9876E−02 | −3.6995E−02 | 9.3632E−03 | −1.2950E−03 | 7.3461E−05 |
| R7 | 0.0000E+00 | −1.3411E−02 | −2.1895E−02 | 5.1453E−03 | 1.1063E−03 | −1.0754E−03 | 2.5041E−04 | −2.0189E−05 |
| R8 | 0.0000E+00 | −4.5982E−03 | −4.8097E−04 | −1.2605E−02 | 8.1534E−03 | −2.5686E−03 | 4.0922E−04 | −2.5219E−05 |
| R9 | −1.4362E+00 | 1.5013E−02 | −7.0127E−02 | 4.4492E−02 | −1.2790E−02 | 2.0896E−03 | −1.8783E−04 | 7.1095E−06 |
| R10 | −1.1402E+00 | −1.5660E−03 | −1.0692E−02 | 5.6253E−03 | −3.2137E−04 | −1.1324E−04 | 1.6494E−05 | −6.4187E−07 |
| R11 | 0.0000E+00 | −7.9371E−02 | 2.5872E−02 | −5.7482E−03 | 8.7373E−04 | −9.5684E−05 | 6.5900E−06 | −2.0304E−07 |
| R12 | 0.0000E+00 | −7.4496E−02 | 1.8651E−02 | −3.5008E−03 | 5.3114E−04 | −6.6035E−05 | 4.9779E−06 | −1.5466E−07 |

TABLE 3

| | |
|---|---|
| 2ω (°) | 57.87 |
| FNO | 1.57 |
| f (mm) | 5.761 |
| f1 (mm) | 6.187 |
| f2 (mm) | −3.600 |
| f3 (mm) | 5.788 |
| f4 (mm) | 7.639 |
| f5 (mm) | −67.120 |
| f6 (mm) | 42.971 |
| TTL (mm) | 8.471 |
| LB (mm) | 1.401 |
| IH (mm) | 3.092 |

TABLE 4

| | R | d | | nd | | νd | Effective radius (mm) |
|---|---|---|---|---|---|---|---|
| S1 | ∞ | d0= | −0.233 | | | | 1.841 |
| R1 | 3.68901 | d1= | 0.778 | nd1 | 1.6355 | ν1 23.97 | 1.881 |
| R2 | 6.89462 | d2= | 1.156 | | | | 1.950 |
| R3 | −3.87222 | d3= | 0.300 | nd2 | 1.6355 | ν2 23.97 | 2.129 |
| R4 | 22.77777 | d4= | 0.196 | | | | 2.120 |
| R5 | 2.33058 | d5= | 0.697 | nd3 | 1.6355 | ν3 23.97 | 2.145 |
| R6 | 13.81496 | d6= | 0.100 | | | | 2.140 |
| R7 | 2.42970 | d7= | 0.588 | nd4 | 1.6355 | ν4 23.97 | 2.349 |
| R8 | 2.90415 | d8= | 1.816 | | | | 2.480 |
| R9 | −0.94228 | d9= | 0.431 | nd5 | 1.6355 | ν5 23.97 | 2.576 |
| R10 | −1.15936 | d10= | 0.050 | | | | 2.729 |

TABLE 4-continued

| | R | d | nd | vd | Effective radius (mm) |
|---|---|---|---|---|---|
| R11 | 3.21885 | d11= 0.914 | nd6 1.6355 | v6 23.97 | 3.006 |
| R12 | 4.29643 | d12= 0.200 | | | 3.066 |
| R13 | ∞ | d13= 0.844 | nd7 1.5168 | v7 64.17 | 3.064 |
| R14 | ∞ | d14= 0.537 | | | 3.061 |

Reference wavelength = 940 nm

TABLE 5

| | Conic coefficient k | Aspherical surface coefficients | | | | | | |
|---|---|---|---|---|---|---|---|---|
| | | A4 | A6 | A8 | A10 | A12 | A14 | A16 |
| R1 | −5.0794E+00 | 8.3586E−03 | −4.4645E−03 | 1.5623E−04 | −8.5189E−05 | 0.0000E+00 | 0.0000E+00 | 0.0000E+00 |
| R2 | 0.0000E+00 | −3.7073E−03 | −5.5720E−03 | 2.6977E−04 | 0.0000E+00 | 0.0000E+00 | 0.0000E+00 | 0.0000E+00 |
| R3 | 0.0000E+00 | 2.1620E−02 | −3.8445E−03 | 1.8288E−03 | −2.6978E−04 | 9.9892E−06 | 0.0000E+00 | 0.0000E+00 |
| R4 | 0.0000E+00 | −7.1867E−02 | 2.4581E−02 | −3.2199E−03 | 2.2626E−04 | −1.8830E−05 | 0.0000E+00 | 0.0000E+00 |
| R5 | 0.0000E+00 | −5.0082E−02 | 5.3995E−03 | −1.3577E−02 | 9.3731E−03 | −3.2866E−03 | 5.7815E−04 | −3.9838E−05 |
| R6 | 0.0000E+00 | 4.6535E−02 | −4.5342E−02 | 5.3034E−03 | 4.6777E−03 | −2.2213E−03 | 3.9158E−04 | −2.4557E−05 |
| R7 | 0.0000E+00 | −3.2647E−02 | −7.7235E−03 | 2.0973E−03 | 4.1225E−03 | 1.5662E−04 | −3.8511E−05 | 2.8653E−06 |
| R8 | 0.0000E+00 | −3.6998E−02 | 1.1350E−02 | −6.0677E−03 | 1.3348E−03 | −9.6977E−05 | −8.4821E−06 | 1.2191E−06 |
| R9 | −1.5264E+00 | −5.6963E−04 | −3.4866E−02 | 2.4042E−02 | −6.0670E−03 | 7.5302E−04 | −4.6323E−05 | 1.1321E−06 |
| R10 | −1.2383E+00 | 7.6518E−03 | −8.7257E−03 | 3.7939E−03 | 2.0800E−04 | −2.0500E−04 | 2.5198E−05 | −9.7013E−07 |
| R11 | 0.0000E+00 | −53448E−02 | 1.7633E−02 | −4.8860E−03 | 8.8077E−04 | −1.0359E−04 | 7.1184E−06 | −2.1410E−07 |
| R12 | 0.0000E+00 | −4.7710E−02 | 1.5064E−02 | −3.7587E−03 | 5.9915E−04 | −6.2073E−05 | 3.7845E−06 | −9.9466E−08 |

TABLE 6

| 2ω (°) | 57.72 |
|---|---|
| FNO | 1.57 |
| f (mm) | 5.780 |
| f1 (mm) | 11.849 |
| f2 (mm) | −5.375 |
| f3 (mm) | 4.470 |
| f4 (mm) | 16.491 |
| f5 (mm) | −33.445 |
| f6 (mm) | 15.831 |
| TTL (mm) | 8.607 |
| LB (mm) | 1.581 |
| IH (mm) | 3.092 |

As shown in Table 10, Embodiment 2 satisfies the conditions (1) to (7).

Figure 4:
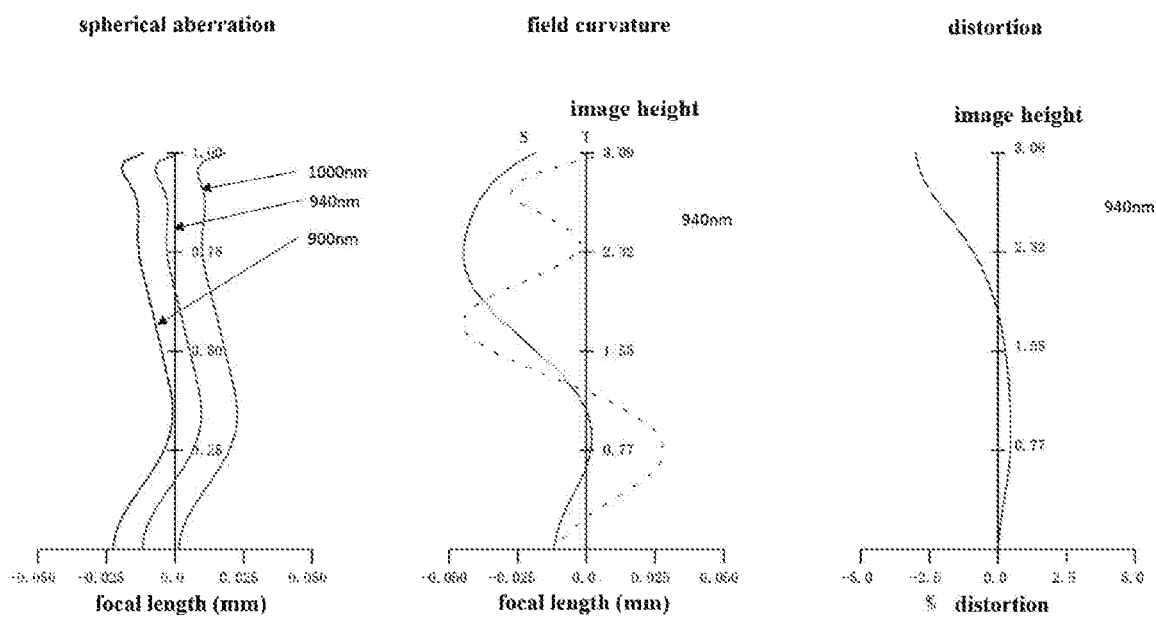
FIG. 4 is a schematic diagram of a spherical aberration, a field curvature and a distortion of the camera lens LA in accordance with Embodiment 2 of the present disclosure.

A spherical aberration, a field curvature and a distortion of the camera lens LA in Embodiment 2 are as shown in FIG. 4. Regarding the camera lens LA in Embodiment 2, as shown in Table 6, FNO=1.57 is bright, and as shown in FIG. 4, it has good optical characteristics.

Embodiment 3

Figure 5:
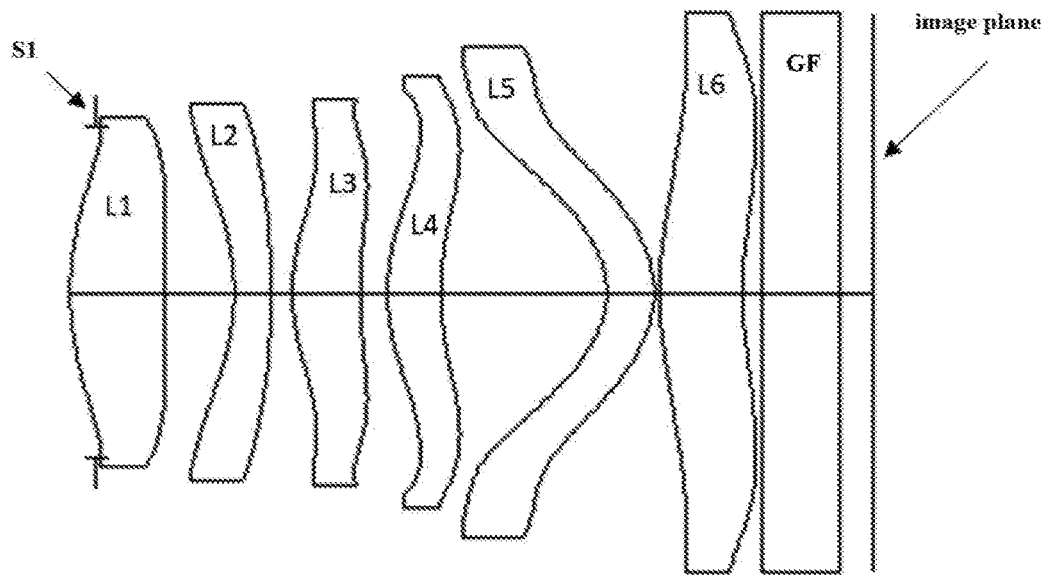
FIG. 5 is a schematic diagram of a structure of a camera lens LA in accordance with Embodiment 3 of the present disclosure.

FIG. 5 is a schematic diagram of a structure of a camera lens LA in accordance with Embodiment 3 of the present disclosure. In Embodiment 3, the camera lens LA includes a first lens L1 to a sixth lens L6. In the following, Table 7 shows respective curvature radiuses R of the object side and the image side of each of the first lens L1 to the sixth lens L6, the center thickness of each lens or the distance d between lenses, the refractive index nd and the abbe number v, Table 8 shows conic coefficients k and aspherical coefficients, and Table 9 shows 2ω, FNO, f, f1, f2, f3, f4, f5, f6, TTL, and IH.

TABLE 7

| | R | d | nd | vd | Effective radius (mm) |
|---|---|---|---|---|---|
| S1 | ∞ | d0= −0.277 | | | 1.850 |
| R1 | 3.4977 | d1= 1.000 | nd1 1.5286 | v1 76.98 | 1.890 |
| R2 | 20.55292 | d2= 0.758 | | | 1.952 |
| R3 | −2.68956 | d3= 0.380 | nd2 1.6355 | v2 23.97 | 2.041 |
| R4 | 34.27708 | d4= 0.241 | | | 2.101 |
| R5 | 2.27436 | d=5 0.729 | nd3 1.6355 | v3 21.97 | 2.144 |
| R6 | 8.58817 | d6= 0.288 | | | 2.114 |
| R7 | 2.35075 | d7= 0.573 | nd4 1.6355 | v4 23.97 | 2.250 |
| R8 | 3.60824 | d8= 1.779 | | | 2.392 |
| R9 | −1.02672 | d9= 0.504 | nd5 1.6355 | v5 23.97 | 2.516 |
| R10 | −1.29160 | d10= 0.050 | | | 2.741 |
| R11 | 3.29844 | d11= 0.894 | nd6 1.6355 | v6 23.97 | 3.050 |
| R12 | 3.91770 | d12= 0.200 | | | 3.101 |
| R13 | ∞ | d13= 0.844 | nd7 1.5168 | v7 64.17 | 3.104 |
| R14 | ∞ | d14= 0.356 | | | 3.109 |

Reference wavelength = 940 nm

TABLE 8

| | Conic coefficient k | Aspherical surface coefficients | | | | | | |
|---|---|---|---|---|---|---|---|---|
| | | A4 | A6 | A8 | A10 | A12 | A14 | A16 |
| R1 | −4.1462E+00 | 4.9961E−03 | −1.7601E−03 | −3.9532E−04 | −4.0508E−05 | 0 0000E+00 | 0.0000E+00 | 0.0000E+00 |
| R2 | 0.0000E+00 | −1.3414E−02 | −1.7192E−03 | 1.1638E−05 | 0.0000E+00 | 0.0000E+00 | 0.0000E+00 | 0.0000E+00 |
| R3 | 0.0000E+00 | 3.2081E−03 | 1.8296E−02 | −6.2335E−03 | 1.0999E−03 | −8.0220E−05 | 0.0000E+00 | 0.0000E+00 |
| R4 | 0.0000E+00 | −9.1652E−02 | 4.7103E−02 | −1.2265E−02 | 1.6328E−03 | −9.4387E−05 | 0.0000E+00 | 0.0000E+00 |

TABLE 8-continued

| | Conic coefficient | Asperical surface coefficients | | | | | | |
|---|---|---|---|---|---|---|---|---|
| | k | A4 | A6 | A8 | A10 | A12 | A14 | A16 |
| R5 | 0.0000E+00 | −4.6941E−02 | −1.6976E−02 | 1.0464E−02 | −3.9082E−03 | 7.2057E−04 | −3.1891E−05 | −3.5304E−06 |
| R6 | 0.0000E+00 | 5.5798E−02 | −7.8426E−02 | 3.3260E−02 | −7.8316E−03 | 1.0195E−03 | −4.7724E−05 | −1.0131E−06 |
| R7 | 0.0000E+00 | −1.4885E−02 | −1.6168E−02 | −8.4637E−04 | 1.0901E−03 | 2.1046E−04 | −1.2187E−04 | 1.1037E−05 |
| R8 | 0.0000E+00 | −1.0805E−02 | −4.9212E−04 | −8.3124E−03 | 3.6277E−03 | −5.6365E−04 | 2.4311E−05 | 9.3332E−07 |
| R9 | −1.4632E+00 | 9.2611E−03 | −5.6719E−02 | 3.9828E−02 | −1.2108E−02 | 2.0213E−03 | −1.8116E−04 | 6.7583E−06 |
| R10 | −1.2020E+00 | 3.9738E−03 | −1.4945E−02 | 9.4437E−03 | −1.7451E−03 | 1.2902E−04 | −2.9360E−06 | −4.1178E−08 |
| R11 | 0.0000E+00 | −5.9901E−02 | 1.6609E−02 | −2.8739E−03 | 2.3337E−04 | −7.1747E−06 | 9.8413E−08 | −1.0976E−08 |
| R12 | 0.0000E+00 | −5.2516E−02 | 9.7676E−03 | −4.6571E−04 | −1.7850E−04 | 3.0157E−05 | −1.6944E−06 | 3.0208E−08 |

TABLE 9

| 2ω (°) | 57.50 |
|---|---|
| FNO | 1.57 |
| f (mm) | 5.807 |
| f1 (mm) | 7.921 |
| f2 (mm) | −4.052 |
| f3 (mm) | 4.834 |
| f4 (mm) | 9.379 |
| f5 (mm) | −29.432 |
| f6 (mm) | 21.974 |
| TTL (mm) | 8.596 |
| LB (mm) | 1.400 |
| IH (mm) | 3.092 |

As shown in Table 10, Embodiment 3 satisfies the conditions (1) to (7).

Figure 6:
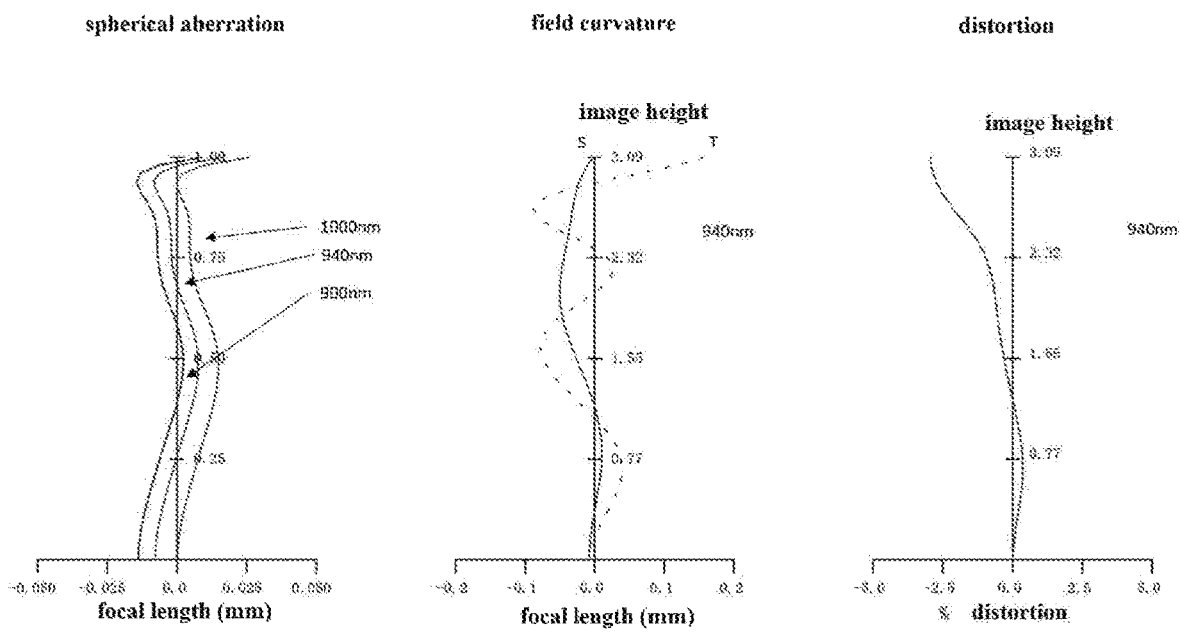
FIG. 6 is a schematic diagram of a spherical aberration, a field curvature and a distortion of the camera lens LA in accordance with Embodiment 3 of the present disclosure.

A spherical aberration, a field curvature, and a distortion of the camera lens LA in Embodiment 3 are as shown in FIG. 6. Regarding the camera lens LA in Embodiment 3, as shown in Table 9, FNO=1.57 is bright, and as shown in FIG. 6, it has good optical characteristics.

Table 10 shows values corresponding to parameters defined by the conditions (1) to (7) of Embodiments 1-3.

TABLE 10

| | Embodiment 1 | Embodiment 2 | Embodiment 3 | Notes |
|---|---|---|---|---|
| |R3/R4| | 0.025 | 0.170 | 0.078 | Condition (1) |
| f3/f | 1.005 | 0.773 | 0.832 | Condition (2) |
| f1/f | 1.074 | 2.050 | 1.364 | Condition (3) |
| f2/f | −0.625 | −0.930 | −0.698 | Condition (4) |
| f1/f2 | −1.719 | −2.204 | −1.955 | Condition (5) |
| R5/R6 | 0.345 | 0.169 | 0.265 | Condition (5) |
| R7/R8 | 0.570 | 0.837 | 0.651 | Condition (7) |

REFERENCE SIGNS

LA: camera lens
S1: aperture;
L1: first lens;
L2: second lens;
L3: third lens;
L4: fourth lens;
L5: fifth lens;
L6: sixth lens;
GF: glass plate;
R: curvature radius of an optical surface, a central curvature radius for a lens;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of the object side surface of the glass plate GF;
R14: curvature radius of the image side surface of the glass plate GF;
d: center thickness of a lens and distance between lenses;
d1: center thickness of the first lens L1;
d2: on-axis distance from the image side surface of the first lens L1 to the object side surface of the second lens L2;
d3: center thickness of the second lens L2;
d4: on-axis distance from the image side surface of the second lens L2 to the object side surface of the third lens L3;
d5: center thickness of the third lens L3;
d6: on-axis distance from the image side surface of the third lens L3 to the object side surface of the fourth lens L4;
d7: center thickness of the fourth lens L4;
d8: on-axis distance from the image side surface of the fourth lens L4 to the object side surface of the fifth lens L5;
d9: center thickness of the fifth lens L5;
d10: on-axis distance from the image side surface of the fifth lens L5 to the object side surface of the sixth lens L6;
d11: center thickness of the sixth lens L6;
d12: on-axis distance from the image side surface of the sixth lens L6 to the object side surface of the glass plate GF;
d13: center thickness of the glass plate GF;
d14: on-axis distance from the image side surface of the glass plate GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;

nd6: refractive index of d line of the sixth lens L6;
nd7: refractive index of d line of the glass plate GF;
v: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the glass plate GF.

What is claimed is:

1. A camera lens, comprising, from an object side:
a first lens having a positive refractive power;
a second lens having a negative refractive power;
a third lens having a positive refractive power;
a fourth lens having a positive refractive power;
a fifth lens having a negative refractive power; and
a sixth lens having a positive refractive power,
wherein the camera lens satisfies following conditions:

$$0.02 \leq |R3/R4| \leq 0.30;$$

$$0.60 \leq f3/f \leq 1.20,$$

where
R3 denotes a curvature radius of an object side surface of the second lens;
R4 denotes a curvature radius of an image side surface of the second lens;
f denotes a focal length of the camera lens; and
f3 denotes a focal length of the third lens.

2. The camera lens as claimed in claim 1, further satisfying a following condition:

$$1.00 \leq f1/f \leq 2.20,$$

where
f1 denotes a focal length of the first lens.

3. The camera lens as claimed in claim 1, further satisfying a following condition:

$$-1.00 \leq f2/f \leq -0.50,$$

where
f2 denotes a focal length of the second lens.

4. The camera lens as claimed in claim 1, further satisfying a following condition:

$$-2.50 \leq f1/f2 \leq -1.50,$$

where
f1 denotes a focal length of the first lens, and
f2 denotes a focal length of the second lens.

5. The camera lens as claimed in claim 1, further satisfying a following condition:

$$0.15 \leq R5/R6 \leq 0.35,$$

where
R5 denotes a curvature radius of an object side surface of the third lens; and
R6 denotes a curvature radius of an image side surface of the third lens.

6. The camera lens as claimed in claim 1, further satisfying a following condition:

$$0.55 \leq R7/R8 \leq 0.85,$$

where
R7 denotes a curvature radius of an object side surface of the fourth lens; and
R8 denotes a curvature radius of an image side surface of the fourth lens.

* * * * *